United States Patent [19]

Pano et al.

[11] 4,143,521

[45] Mar. 13, 1979

[54] PROCESS FOR THE PRODUCTION OF ETHYLENE

[75] Inventors: Benjamin V. Pano, Watertown; Sharad S. Gandbhir, Newton, both of Mass.

[73] Assignee: Stone & Webster Engineering Corporation, Boston, Mass.

[21] Appl. No.: 766,757

[22] Filed: Feb. 8, 1977

[51] Int. Cl.[2] ........................ F25B 15/00; C07C 3/00; C07C 5/00; C07C 11/02

[52] U.S. Cl. .................................. 62/101; 260/683 R

[58] Field of Search .............. 62/101, 476; 260/683 R

[56] References Cited

U.S. PATENT DOCUMENTS

| | | | |
|---|---|---|---|
| Re. 27,074 | 2/1971 | Aerov et al. | 62/112 |
| 2,944,407 | 7/1960 | Pettis | 62/144 |
| 3,166,914 | 1/1965 | Hallatt | 62/101 |
| 3,347,949 | 10/1967 | Dollinger et al. | 260/683 R |
| 3,717,007 | 2/1973 | Kuhlenschmidt | 62/101 |
| 3,817,050 | 6/1974 | Alexander et al. | 62/101 |
| 3,817,050 | 6/1974 | Alexander et al. | 62/101 |
| 3,862,898 | 1/1975 | Boyd et al. | 260/683 R |

*Primary Examiner*—Lloyd L. King
*Attorney, Agent, or Firm*—Morgan, Finnegan, Pine, Foley & Lee

[57] ABSTRACT

A process for the production of ethylene wherein low-level waste heat released during ethylene production is utilized in an ammonia absorption refrigeration system to generate a refrigerant, which refrigerant is used for cooling various process streams thereby reducing the energy requirements of the process.

18 Claims, 4 Drawing Figures

PROCESS FOR THE PRODUCTION OF ETHYLENE

FIELD OF THE INVENTION

The present invention relates to the production of ethylene.

In one of its aspects, the invention relates to the use of low-level waste heat released during ethylene production to generate refrigerant in an ammonia absorption refrigeration system.

In a more specific aspect, the present invention relates to the use of low-level waste heat released during ethylene production to generate refrigerant in an ammonia refrigeration system which refrigerant is used for cooling process streams during ethylene production.

BACKGROUND OF THE INVENTION

1. Description of the Prior Art

As is well known to those skilled in the art, conventional ethylene manufacturing facilities utilize cooling water, which is generally available at a temperature of about 80° F., to cool various equipment and process streams during various stages of ethylene production. Cooling water is utilized as the cooling medium in the primary frationation and cooling zone to cool the hot quench water, in the compression zone to condense the steam used to drive steam turbines which power cracked gas compressors and to cool the compressor cracked gases. It is also used in the purification zone to cool overhead vapors in the condensers associated with fractionation towers and in the propylene refrigeration system, which is a part of the purification zone, to condense both the propylene vapor which has been compressed and the steam used to drive turbines which power the propylene compressors.

Some of the equipment or apparatus described above develop low levels of heat which is either rejected to cooling water or to the atmosphere. For example, the low-level waste heat which is generated in the turbine exhaust of a steam gas turbine compressor is, under conventional techniques, rejected to either cooling water or the atmosphere. Heretofore, the rejection of available low-level heat generated in the various equipment as explained previously was, from an economical standpoint, not entirely unobjectionable since fuel was relatively inexpensive and readily available. Unfortunately, however, the relatively high cost of today's fuels, coupled with present efforts to conserve energy, now makes it necessary that new procedures be developed so as to minimize the amount of fuel required for an ethylene production system and, if possible, to capture sources of energy such as is present in low-level waste heat for possible use in the ethylene production plant.

Attempts to utilize low-level waste heat in ethylene production have not heretofore been entirely satisfactory due primarily to the fact that the amount and temperature of the heat generated were not sufficient to utilize the heat as a heating source for the equipment, which in some cases requires temperatures sufficient to convert water to steam. As mentioned previously, cooling water has been the cooling medium utilized to cool equipment and process streams. An ammonia absorption refrigeration system has already been proposed as a possible technique for cooling certain equipment in oil refineries and elsewhere such as is shown in *Refiner & Natural Gasoline Manufacture*, Vol. 20, No. 5, May, 1941, page (146) 56 and U.S. Pat. No. 3,817,050 (issued June 18, 1974). However, no satisfactory system has heretofore been proposed for supplying the energy required for generating the ammonia refrigerant.

It has been found that the low-level waste heat produced during ethylene production can be effectively utilized to generate refrigerant in an ammonia absorption system used for cooling equipment and process streams. Advantageously, no additional outside sources of heat are required to generate the ammonia refrigerant and, since cooling of the process streams is effected at temperatures significantly lower than could be obtained using cooling water, expensive process equipment can be either eliminated or reduced in size and the overall cost of producing ethylene can be significantly reduced.

It is therefore an object of the present invention to provide a cooling method for cooling process streams produced during ethylene manufacture which method utilizes low-level waste heat, e.g., the heat of hot water or low-pressure steam, to generate refrigerant in an ammonia absorption refrigeration system.

Another object is to utilize a refrigeration method in ethylene production which method permits lower operating temperatures and pressures in the product recovery purification zone.

A further object is to provide a refrigeration system which can be readily integrated into the overall ethylene production process to achieve the more economical production of ethylene.

These and other objects will become apparent from the following summary of the invention and description taken in conjunction with the accompanying drawing.

SUMMARY OF THE INVENTION

Broadly contemplated, the present invention provides an improvement in a process of thermally cracking hydrocarbons to produce olefins wherein waste heat is released and cooling of system streams is effected, the improvement comprising the steps of:

heating a rich ammonia stream from an ammonia absorption refrigeration system with waste heat released by said olefin production process to generate an ammonia refrigerant in said ammonia absorption refrigeration system; and cooling said system streams in said olefin production process with ammonia refrigerant generated in said ammonia absorption refrigeration system.

According to the broad concept of the invention, the source of heat released by the olefin production process can be heat released by quench water from a direct contact cooler. In addition, heat released by steam turbines operating compressors utilized to compress the system streams can also be a source of heat. Moreover, according to the broad concept of the invention, system streams can be cooled with generated ammonia refrigerant at various points, e.g., prior to introducing the system streams into the compressors utilized for compressing the system streams.

In a more specific aspect the present invention provides an improvement in the process for the production of ethylene wherein a hydrocarbon is cracked to produce a process stream of cracked gases. The process stream of cracked gases is introduced into a rapid cooling zone to cool the gases and is, thereafter, passed into a primary fractionation and cooling zone to further cool the gases and remove heavy hydrocarbons. The process stream of cracked gases is then passed into a compression zone and is, thereafter, directed through a purification zone wherein overhead vapors are generated and ethylene is recovered from the process stream of cracked gases. The improvement of the present invention utilizes low-level waste heat released in the primary fractionation and cooling zone and the compression zone to generate an ammonia refrigerant for cooling the cracked gas process stream in the compression zone and the overhead vapors in the purification zone. More specifically, the improvement comprises:

(i) heating a rich ammonia stream with low-level waste heat released in said primary fractionation and cooling zone and said compression zone;

(ii) separating the heated rich ammonia stream into substantially pure ammonia vapor and a lean ammonia stream;

(iii) condensing said substantially pure ammonia vapor to ammonia liquid;

(iv) passing said ammonia liquid through pressure reducing means to produce said ammonia refrigerant;

(v) cooling said process stream of cracked gases in said compression zone and said overhead vapors in said purification zone with said ammonia refrigerant;

(vi) thereafter, combining said ammonia refrigerant with said lean ammonia stream to form a rich ammonia stream; and (vii) directing said rich ammonia stream back to step (i).

The improvement additionally comprises condensing propylene refrigerant vapors in the propylene refrigeration system of the purification zone with said ammonia refrigerant.

DETAILED DESCRIPTION OF THE INVENTION

Figure 1:
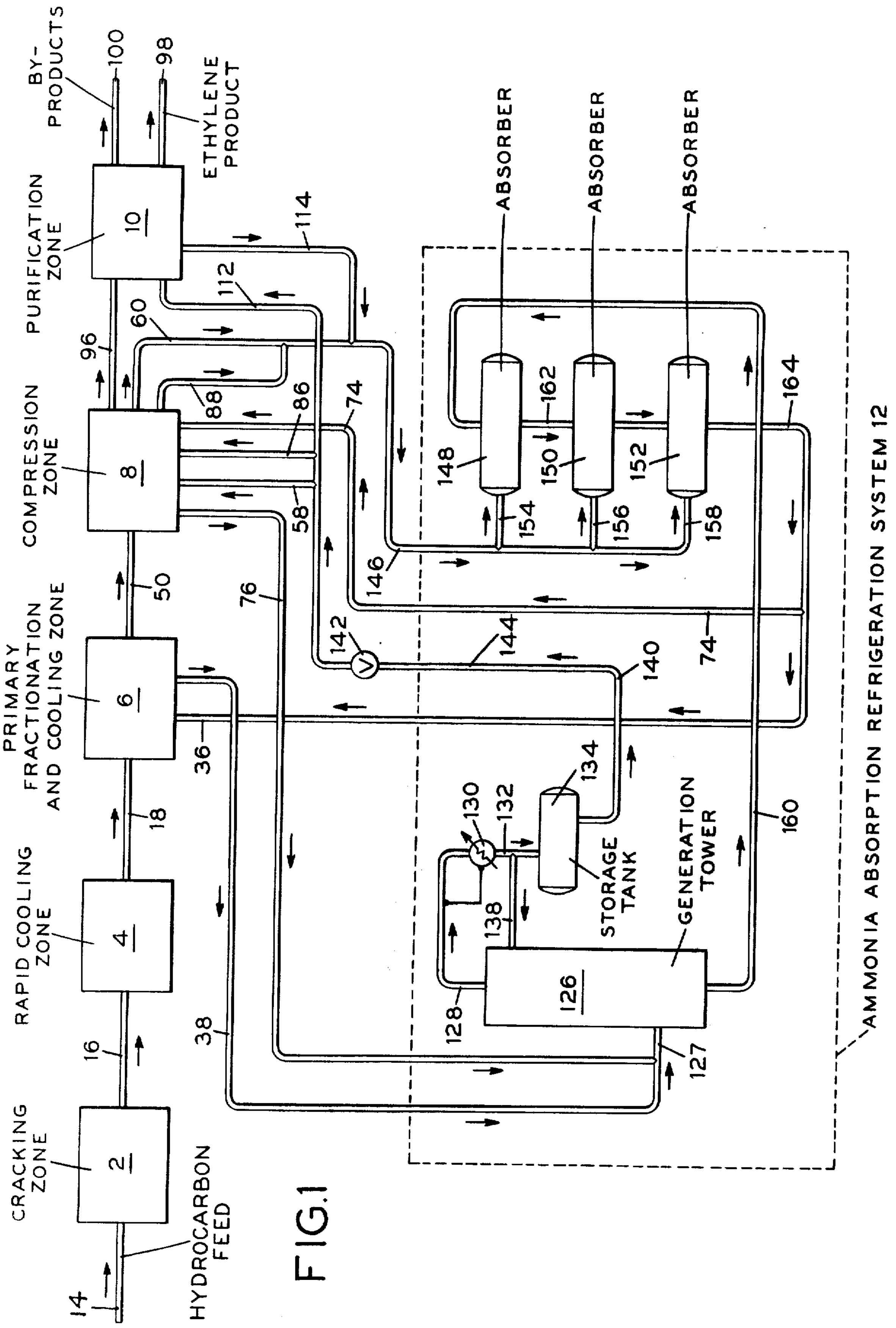
FIG. 1 is a schematic diagram illustrating the sequence of treatment zones for producing ethylene and their relationship to the ammonia absorption refrigeration system.

As shown in FIG. 1, the sequence of treatment steps (shown as zones) for producing ethylene includes: a cracking zone generally represented by reference numeral 2, a rapid cooling zone 4, a primary fractionation and cooling zone 6, a compression zone 8, and a purification zone 10. The ammonia absorption refrigeration system which is used to treat process streams in the pertinent treatment zones is generally illustrated by reference numeral 12. The hydrocarbon feed is initially directed through line 14 into the cracking zone 2 of an ethylene processing plant. This feed stock can comprise ethane, propane, butane, pentane, naphtha, gas oil or mixtures of these hydrocarbons.

The cracking zone 2 includes a cracking furnace (not shown) which receives the hydrocarbon feed which at this stage can be in the liquid or vapor phase or mixed liquid vapor phase. The hydrocarbon feed is heated in the cracking furnace at highly elevated temperatures either by superheated steam, radiant heat, convection heat or a combination thereof to achieve the desired cracking. The procedures for cracking the aforementioned hydrocarbons are well known to those skilled in the art.

The hydrocarbon gases leaving the cracking zone at high temperatures are subjected to immediate cooling to terminate the pyrolysis reaction and ensure the production of a cracked product having a high ethylene content. This cooling can be effected by introducing the process stream of gases into a rapid cooling zone 4. Thus, the hydrocarbon gases exiting the cracking zone 2 are introduced through line 16 into rapid cooling zone 4.

The apparatus and equipment in the rapid cooling zone 4 are conventional and include cooling means which are adapted to rapidly cool hot fluids. A cooling apparatus and process which can be utilized as the cooling means in the rapid cooling zone 4 is illustrated in U.S. Pat. No. 3,403,722 (issued Oct. 1, 1968).

Figure 2:
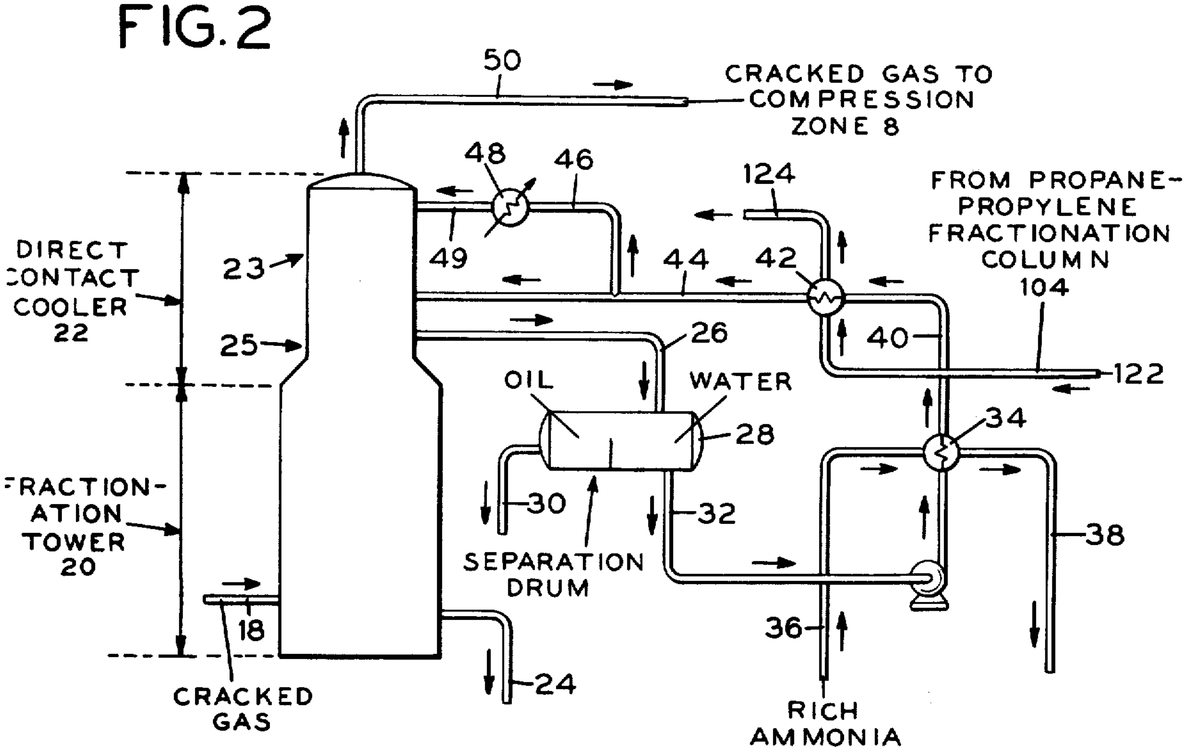
FIG. 2 is one arrangement of some of the apparatus parts illustrating pertinent flow characteristics within the primary fractionation and cooling zone of FIG. 1.

The cooled hydrocarbon gases (generally cooled to a temperature of about 1000° to 1400° F.) exit the rapid cooling zone 4 through line 18 and are introduced into a fractionation tower 20, seen in FIG. 2, which is located in the primary fractionation and cooling zone 6 wherein the hydrocarbon gases are further cooled and subjected to primary fractionation to remove a fuel oil fraction from the cracked gas stream. Thus, referring to FIG. 2, it will be seen that the cooled hydrocarbon gases enter the primary fractionation and cooling zone 6 and enter a conventional primary fractionation tower 20 through line 18. The fractionation tower 20 has a direct contact cooler 22 associated therewith. The primary fractionation tower 20 is conventional and in general is a low pressure fractionator which separates a fuel oil fraction from the cracked gas stream.

The fuel oil fraction (having a molecular weight of from about 170 to about 200) in the primary fractionation tower 20 exits the primary fractionation tower 20 through line 24 and is subsequently recovered.

The remainder of the cracked gas streams (comprising $H_2$ and $C_1$ to $C_{12}$ hydrocarbons) is passed into direct contact cooler 22 wherein the cracked gas stream is passed countercurrently to water as the cooling medium to further cool the cracked gas stream and condense the heavier hydrocarbons. Direct contact cooler 22 has an upper stage 23 and a lower stage 25. The heavier hydrocarbons (useful as a raw gasoline product) are separated from the cracked gas by the condensing procedure and exit direct contact cooler 22 through line 26 together with the cooling or quenching water which must be separated. In order to effect separation, the quench water containing heavy hydrocarbons exiting direct contact cooler 22 through line 26 at a temperature of about 180° to 210° F., thereafter, is introduced into separation drum 28 wherein the heavier hydrocarbons are separated from the quench water. The separated hydrocarbons leave the separation drum 28 through line 30 and are recovered. The separated quench water leaves separation drum 28 at a temperature of about 180° to 210° F. through line 32 and is directed into heat exchanger 34 where the quench water from separation drum 28 is cooled to a temperature of about 155° F. by indirect contact with a rich ammonia stream 36 from the ammonia absorption refrigeration system 12. In heat exchanger 34 the rich ammonia stream is partially vaporized by heating to a temperature of about 130° to 200° F. which has been found to be generally sufficient to generate the ammonia refrigerant used for cooling the various process streams. It is at this point where low-level waste heat is employed as one of the heating sites to heat the rich ammonia stream for generation of ammonia refrigerant. Thus, a rich ammonia stream, i.e., one containing ammonia absorbed in water at a concentration of about 70% by weight ammonia at a temperature of about 95° F. and directed from the ammonia absorption refrigeration system 12, is introduced into heat exchanger 34 through line 36. Advantageously, in heat exchanger 34 the temperature of the hot quench water enters at about 180° to 210° F. Thus, by passing the rich ammonia stream in indirect contact with the hot quench water two purposes are achieved, i.e., the rich ammonia stream is partially vaporized by heating to a temperature of from 130° to 200° F. and the quench water in heat exchanger 34 is thus cooled as part of the cooling process prior to return of the quench water to direct contact cooler 22.

The rich ammonia stream heated to a temperature of about 130° to 200° F. now contains water and ammonia vapor and leaves heat exchanger 34 through line 38 and is returned to ammonia absorption refrigeration system 12 through line 38 where it is converged with line 76.

Prior to returning the quench water back to direct contact cooler 22 it is preferred that the quench water be subjected to additional cooling. Thus, quench water exiting heat exchanger 34 through line 40 at a temperature of about 155° F. is directed to heat exchanger 42 where the quench water is further cooled to a temperature of about 130° to 135° F.

As will be discussed in detail, hereafter, the heated water in heat exchanger 42 can advantageously be used as a source of heat in the reboiler for the propane-propylene fractionation column situated in the purification zone 10 of the ethylene process plant. The quench water leaving heat exchanger 42 through line 44 at a temperature of about 130° to 135° F. is directed back to the lower section 25 of direct contact cooler 22 with a portion of the quench water from line 44 being diverted through line 46 to indirect heat exchanger 48 wherein the water is further cooled to a temperature of about 100° F. This cooled quench water is then re-introduced into the upper stage 23 of direct contact cooler 22 through line 49.

Figure 3:
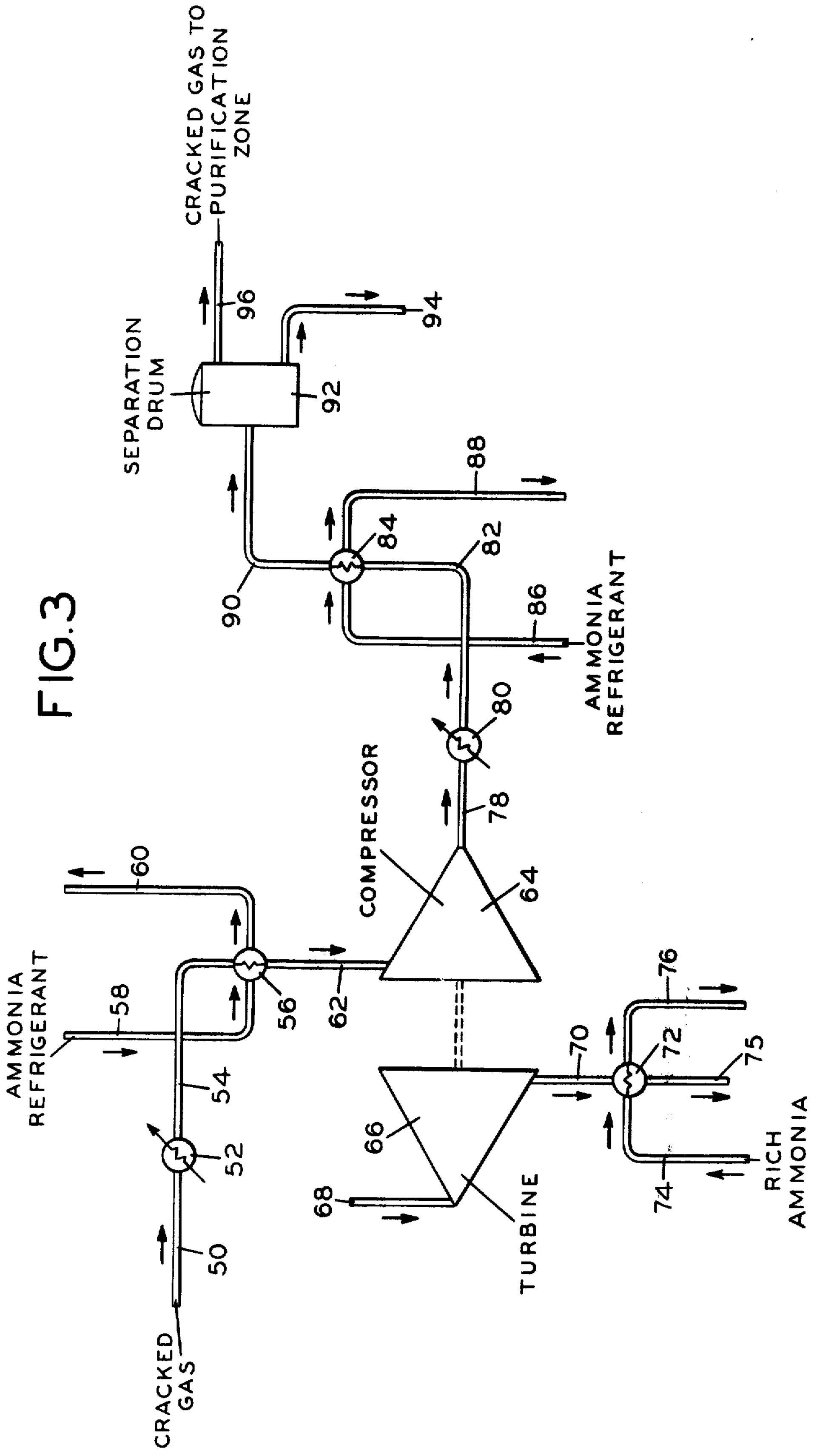
FIG. 3 is an illustration of one of the compression systems or stages illustrating some of the apparatus parts and pertinent flow characteristics within the compression zone of FIG. 1.

One recognized technique utilized by the art for obtaining substantially pure ethylene is to fractionally distill at high pressures the ethylene process stream leaving the primary fractionation and cooling zone 6. As best seen in FIGS. 1 and 3, the cracked gas exiting the primary fractionation and cooling zone 6 at pressures of about 18 p.s.i.a. must be compressed to about 500 to 550 p.s.i.a. so as to ultimately obtain liquefaction and achieve the desired product specification in the fractionation towers of the purification zone 10. Accordingly, the uncondensed cracked gas exiting direct contact cooler 22 through line 50 and which is in the form of a process stream comprising, ehtylene, propylene, ethane, butane, etc., is directed to compression zone 8 as is shown in FIG. 1. In the compression zone 8, the cracked gas is compressed in stages to very high pressures. This compression achieves the high pressures necessary for distillation in the purification zone 10 as explained previously and, in addition, condenses additional longer chain hydrocarbons. It is preferred to carry out the compression treatment in at least two and preferably four stages.

By passing the process stream through the compression stages the temperatures of the compressed process stream is raised significantly. Heretofore, as explained previously, cooling water was utilized as the cooling medium for cooling these process streams which was effective to reduce the temperature of the process stream to from about 95° to 105° F. According to the present invention, however, the low-level waste heat generated by the compressors in the compression stages is utilized to generate ammonia regrigerant in the ammonia absorption refrigeration system 12 which ammonia refrigerant is utilized to cool the process stream between compression stages. Advantageously, the temperature of the process streams are reduced to a much lower degree, i.e., 80° to 85° F. and as a result less compression and, hence, smaller compressors are required in the compression zone 8 and substantially greater amounts of the heavier hydrocarbons can be removed prior to entering the purification zone 10. In addition, the equipment necessary to fractionally distill the process stream in the purification zone 10 can be substantially reduced in size over those employed utilizing cooling water as the cooling medium in the compression zone 8. As discussed previously, the pressure applied to the gas stream is increased in each stage. Thus, the first stage compressor compresses the gas stream from about 19 to 45 p.s.i.a., the second stage compressor further compresses the gas from about 40 to 105 p.s.i.a., the third stage compressor further compresses the gas from about 100 to 250 p.s.i.a. and the fourth stage further compresses the gas stream to the desired final pressures of about 540 p.s.i.a. or higher.

In FIG. 3, one complete compressor stage is shown but it is to be understood that it is merely for purposes of illustration and, in fact, at least two and preferably four such stages are included in the compression zone.

Thus referring to FIG. 3, it can be seen that the compression zone 8 includes an indirect heat exchanger 52 which receives the cracked gas stream from the primary fractionation and cooling zone 6 through line 50. The cracked gas stream is cooled in heat exchanger 52 to a temperature of about 95° F. using cooling water. After cooling, the cracked gas stream exiting heat exchanger 52 through line 54 is thereafter directed to indirect heat exchanger 56 wherein the cracked gas stream is cooled to a temperature of about 80° to 85° F. using an ammonia refrigerant generated in the ammonia absorption refrigeration system 12 in a manner which will be discussed in detail, hereafter. Heat exchanger 56 is conventional and can be of the type generally known to the art as the shell and tube type. The ammonia refrigerant enters heat exchanger 56 through line 58 at a temperature of about 70° F. amd at a pressure of about 130 p.s.i.a. wherein the process stream is cooled to the desired temperature of about 80° to 85° F. The ammonia refrigerant exits heat exchanger 56 through line 60 at a temperature of about 70° F. which at this temperature is in the form of a vapor. The ammonia refrigerant is returned to the ammonia absorption refrigeration system 12 which will be discussed hereafter.

The cooled cracked gas process stream leaves heat exchanger 56 through line 62 at a temperature of about 80° to 85° F. and a pressure of about 19 p.s.i.a. where it is directed to a first compressor 64 wherein the first stage of compression of the process stream is accomplished. Compressor 64 is conventional in the art and can be of the centrifugal type. Associated with compressor 64 is a steam turbine 66 which powers compressor 64. Steam turbine 66 is driven by high pressure steam which is introduced into turbine 66 through line 68 at temperatures of about 900° F. and pressures of about 1400 p.s.i.a. According to conventional techniques, the steam leaving the turbine was desirably at as low a temperature and pressure as possible since the steam's capacity for heating upon leaving the turbine was considered too low to be economically recovered. Advantageously, according to the present invention, the low-level waste heat produced at this point is capable of being utilized as one of the sources of heat for generating ammonia refrigerant for cooling the various process streams.

Thus, the steam exiting turbine 66 at pressures of about 5 p.s.i.a. and at temperatures of about 160° F. is directed through line 70 to heat exchanger 72 where it is passed in indirect contact with a rich ammonia stream which enters the heat exchanger 72 through line 74. The rich ammonia stream gains heat from this indirect contacting which heat is sufficient to generate substantially pure ammonia in the ammonia absorption system 12. Thus, the rich ammonia stream is introduced into heat exchanger 72 through line 74 at a temperature of about 95° F. where it is partially vaporized.

The rich ammonia stream leaves heat exchanger 72 through line 76 at a temperature of about 130° to 135° F. containing water and ammonia vapor which is to be returned to the ammonia absorption refrigeration system 12 through line 76 where it will be converged with line 38, best seen in FIG. 1, leaving the primary fractionation and cooling zone 6 as will be discussed hereafter.

The steam used as the heating medium in heat exchanger 72 is removed through line 75.

The cracked gas process stream leaves compressor 64 through line 78 having been compressed to a pressure of about 45 to 50 p.s.i.a. and to a temperature of about 180° to 200° F. and is introduced into heat exchangers 80 and 84 where the heat generated by compression is removed. Thus, the cracked gas stream is introduced through line 78 to indirect heat exchanger 80 and subjected to a first cooling where water is utilized as the cooling medium. The cracked gas stream exits heat exchanger 80 through line 82 at a temperature of about 95° to 105° F. wherein the gas stream is further cooled in second heat exchanger 84 to a temperature of about 80° to 85° F. by passing it in indirect contact with ammonia refrigerant from the ammonia absorption refrigeration system 12. The ammonia refrigerant enters second heat exchanger 84 through line 86 at a temperature of about 70° F. and at pressures of about 130 p.s.i.a. Vaporized ammonia refrigerant generally at temperatures of from 70° F. and pressures of about 130 p.s.i.a. leaves heat exchanger 84 through line 88 and is returned to the ammonia absorption refrigeration system 12.

The cooled cracked gas stream exiting heat exchanger 84 through line 90 is introduced into a separation drum 92 wherein the heavier hydrocarbons, which have been condensed by the compression and cooling treatments, are separated from the cracked gas process stream. Separation can be effected by passing the cooled cracked gas process stream into separation drum 92 wherein the heavy hydrocarbons settle at the base of the drum and are continuously removed through line 94 and recycled or recovered. The vapors situated proximate the top portion of separation drum 92, comprising the cracked gas process stream, exit through line 96 where they are directed to the second compression stage of the compression zone.

The procedure in the compression stage outlined in detail immediately above is repeated in each stage (preferably four) of compression zone 8 until a final cracked gas process stream at a pressure of about 500 to 550 p.s.i.a. is produced. In each stage of compression, the resultant pressures are as indicated previously. Moreover, as explained previously, in each stage heat is generated and cooling is effected in the manner similar to the first stage.

Figure 4:
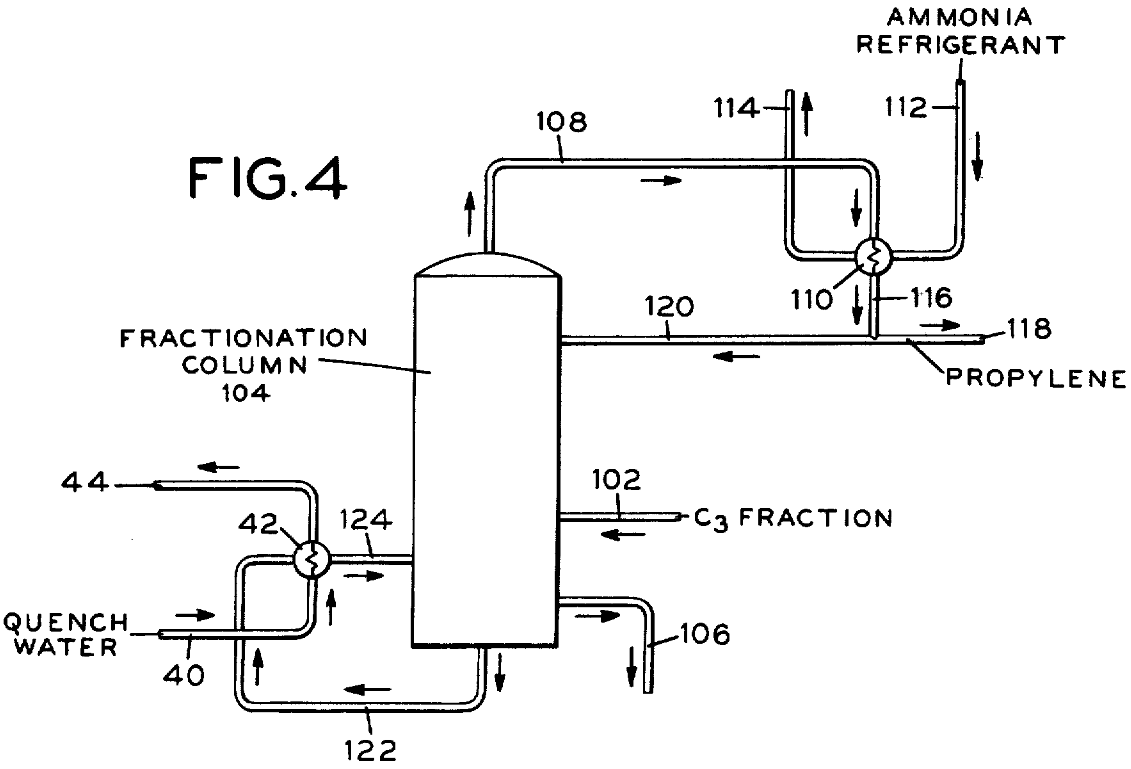
FIG. 4 is a preferred arrangement of some of the apparatus parts of the propane-propylene fractionation column in the purification zone and also illustrating pertinent flow characteristics within the purification zone of FIG. 1.

The cracked gas process stream having been compressed to the desired pressures of about 500 to 550 p.s.i.a. in the last compression stage is thereafter directed through line 96 to the purification zone 10, best seen in FIGS. 1 and 4, for recovery of ethylene, hydrogen, methane, propylene, propane, the $C_4$'s, etc., by conventional separation techniques.

The purification zone 10 generally includes the conventional equipment and procedures for the recovery of ethylene, hydrogen, methane, propane, propylene, butane, butylene, etc.

A demethanization section is included in the purification zone wherein the ethylene fraction of the cracked hydrocarbon gas stream is separated by conventional fractionation techniques from methane and hydrogen. The method for removing methane and hydrogen from the cracked gas stream is conventional and well known to those skilled in the art. Merely as illustrative, the method disclosed in U.S. Pat. No. 3,444,696 (issued May 20, 1969) can be utilized in the demethanization section of the instant invention.

After the hydrogen and methane have been removed from the ethylene process stream in the demethanization section, the ethylene must be separated from the remaining hydrocarbons. One technique utilized by the art for accomplishing ethylene separation is through the use of a series of fractional distillation towers operating at high pressures. Each of these towers separates constituents of the ethylene process stream until a substantially pure ethylene product can be recovered. The technique utilized for recovering ethylene by a series of fractional distillation towers is also well known to those skilled in the art. Generally, however, a series of distillation towers is provided in which de-ethanization, depropanization, etc., of the ethylene process stream is effected.

As shown in FIG. 1, the ethylene product leaves the purification zone 10 through line 98 and is recovered. The remaining hydrocarbons, i.e., butane, butylene, ethane, etc., are valuable by-products of the ethylene process and leave the purification zone through line 100 and are also recovered.

A significant fraction of hydrocarbons separated during the recovery of ethylene in the purification zone 10 are the $C_3$ hydrocarbons which include propane and propylene. The commercial significance of each of these hydrocarbons particularly the propylene makes it desirable to further separate this stream into its two principle components. Accordingly, the propane-propylene fraction in the purification zone 10 is directed through line 102 to a conventional fractionation column 104 which separates the propane from the propylene by conventional fractionation techniques.

Thus, referring to FIG. 4, the propane-propylene fraction is introduced through line 102 into a conventional fractionation column 104 wherein temperatures and pressures are controlled to separate propane from propylene. The propane, being the principle component of the bottoms liquid, is withdrawn from the fractionation column 104 through line 106 at a temperature of about 95° F. Overhead vapors, comprising principally propylene, leave the fractionation column 104 through line 108 at a temperature of about 78° to 85° F. and pressures of about 170 to 190 p.s.i.a. and are passed through condenser 110 (a conventional heat exchanger) where the propylene vapors are condensed by indirect contact with an ammonia refrigerant, the source of the ammonia refrigerant being the ammonia absorption refrigeration system 12. Thus, an ammonia refrigerant stream is directed from the ammonia absorption refrigeration system 12 through line 112 into condenser 110 at a temperature of about 70° F. and at pressures of about 130 p.s.i.a. where it is passed in indirect contact with the propylene vapors, effecting condensation of the propylene vapors. The ammonia refrigerant leaves condenser 110 through line 114 at a pressure of about 130 p.s.i.a. and at a temperature of about 70° F. in the form of a vapor. The ammonia refrigerant is then returned to the ammonia absorption refrigeration system 12.

The condensed propylene leaving condenser 110 through line 116 at a temperature of about 78° F., is directed to recovery through line 118 with a portion of the condensed propylene from line 116 being diverted through line 120 back to fractionation column 104 where the condensed propylene is re-introduced into the fractionation column 104 as a reflux liquid.

In general, the pressure required to achieve the desired propane-propylene separation in fractionation column 104 is affected by the temperature at which the overhead vapors condenser 110 is operated. Thus, with the lower temperatures achieved in the overhead vapors condenser 110 by the use of an ammonia refrigerant, the fractionation column 104 can operate at lower pressures and be reduced in size. With ammonia refrigerant available at 70° F. fractionation column 104 can operate at pressures of 170 to 190 p.s.i.a. and at temperatures of about 78° to 85° F.

As discussed previously, reboiler heat for fractionation column 104 is obtained from the quench water leaving direct contact cooler 22 after the quench water has first been passed through heat exchanger 34 as best seen in FIG. 2. Thus, a liquid mixture of propane and propylene is withdrawn as a stream from fractionation column 104 through line 122 at a temperature of about 95° F. and is introduced into heat exchanger 42 which serves as the reboiler for fractionation column 104. The propane-propylene mixture substantially vaporized in reboiler heat exchanger 42 is re-introduced into fractionation column 104 through line 124.

The ammonia absorption refrigeration system 12 employed in the present invention is of the conventional type and includes: generation tower 126, condenser 130, storage tank 134, pressure reducing means 142, and absorbers 148, 150, and 152. It can be seen from FIG. 1, that the ammonia absorption refrigeration system 12 includes a generation tower 126 which generates substantially pure ammonia from a rich ammonia stream. Thus, the rich ammonia streams which have been partially vaporized by heating to a temperature of about 130° to 200° F. by cooling various process streams in heat exchangers 34 (FIG. 2) and 72 (FIG. 3), (including the heat exchangers of the other stages of compression as discussed previously but not shown) leave heat exchangers 34 and 72 through lines 38 and 76, respectively, and are converged into line 127 where they are introduced into the lower portion of generation tower 126. Accordingly, the distillation heat required in generation tower 126 is supplied by the heat contained in the rich ammonia streams which are directed through lines 38 and 76. The operating pressure for generation tower 126 is set in relation to the temperature of the available cooling water which is used in overhead vapors condenser 130 so that substantially pure ammonia will be condensed. Thus, for cooling water supplied at a temperature of about 80° F., generation tower 126 is maintained at pressures of about 200 p.s.i.a.

Substantially pure ammonia vapors generated in generation tower 126 leave generation tower 126 through line 128 as overhead vapors at a temperature of about 95° F. and a pressure of about 200 p.s.i.a. and are introduced into condenser 130 where the ammonia vapors are condensed by indirect contact with water as the cooling medium. The condensed ammonia leaving condenser 130 through line 132 at a temperature of about 95° F. and a pressure of about 200 p.s.i.a. is directed into storage tank 134 through line 132 with a portion of the condensed ammonia from line 132 being diverted through line 138 back to the upper portion of generation tower 126 where the condensed ammonia is re-introduced into generation tower 126 as a reflux liquid.

The ammonia is contained in storage tank 134 at a pressure of about 200 p.s.i.a. and a temperature of about 95° F. where it is stored prior to being directed to the various cooling sites. Before introducing the ammonia to the various cooling sites (i.e., heat exchangers 56, 84, and condenser 110) it is required to reduce the pressure of the ammonia an amount sufficient to reduce the temperature of the ammonia to about 70° F. This can be effected by interposing pressure reducing means 142 between storage tank 134 and the cooling sites whereby the pressure of the ammonia can be reduced an amount sufficient to reduce the temperature of the ammonia to about 70° F. It should be understood that although a single pressure reducing means 142 is shown in FIG. 1, a multiplicity of pressure reducing means can be used, each of said pressure reducing means located close to a cooling site.

Thus, ammonia liquid at a temperature of about 95° F. and a pressure of about 200 p.s.i.a. is withdrawn from storage tank 134 through line 140 and passed through a pressure reducing or expansion valve 142 where the pressure is reduced to about 130 p.s.i.a. This is sufficient to produce an ammonia refrigerant at a temperature of about 70° F. The ammonia refrigerant leaves pressure reducing valve 142 through line 144 and is directed through lines 58, 86 and 112 into heat exchangers 56 and 84, and condenser 110, respectively. After cooling in the respective heat exchangers and condenser in the manner set forth previously, the ammonia streams leave heat exchangers 56 and 84 and condenser 110 through lines 60, 88, 114, respectively, in the form of vapors at a temperature of about 70° F. and a pressure of about 130 p.s.i.a. and are joined into line 146 where they are introduced into absorbers 148, 150, and 152 through lines 154, 156, and 158, respectively.

Generation tower 126 produces lean ammonia by separating the substantially pure ammonia vapors from the rich ammonia streams. The lean ammonia generated in generation tower 126 leaves the tower through line 160 in the form of a lean ammonia stream, i.e., one containing about 66% by weight ammonia and is introduced at a temperature of about 130° F. into the first of three absorbers 148, 150, and 152. In the absorbers, the lean ammonia stream is enriched with ammonia to a final concentration of about 70% by weight ammonia. This is effected by contacting the lean ammonia with substantially pure ammonia vapor which enters the absorbers through lines 154, 156, and 158. The absorbers are provided with cooling means (not shown) which remove the heat generated by absorption. Thus, the lean ammonia stream enters absorber 148 through line 160 and is withdrawn through line 162 at a temperature of about 100° F. and a concentration of about 67% by weight ammonia where it enters absorber 150 through line 162. The procedure is repeated until a final enriched ammonia stream is provided having a concentration of about 70% by weight ammonia and a temperature of about 95° F.

The rich ammonia stream thus produced is withdrawn from absorber 152 through line 164 and is directed through lines 36 and 74 to heat exchangers 34 (FIG. 2) and 72 (FIG. 3), respectively, in the primary fractionation and cooling and compression zones where they are heated by low-level waste heat as discussed previously.

It is clear that the present invention provides a system in which low-level waste heat is efficiently utilized to generate ammonia refrigerant which ammonia refrigerant is advantageously employed to cool various process streams and equipment. It will, of course, be understood that the invention can be utilized in other areas of olefin production than those described herein. For example, in certain instances a propylene refrigerant system is introduced in the processing technique wherein a propylene refrigerant is utilized as the cooling medium for condensing overhead vapors containing primarily ethylene in the condenser associated with an ethylene fractionation column situated in the purification zone 10. Propylene is preferred as the cooling medium since the temperature of available cooling water is insufficient to condense the ethylene overhead vapors.

As is known to those skilled in the art, in a propylene refrigerant system, compressors and turbines (similar to those used in the compression zone 8) are utilized to compress propylene gas to the desired operating pressures. This compression develops low-level waste heat which can also be utilized to generate refrigerant in the ammonia absorption refrigeration system 12. Likewise, the ammonia refrigerant generated in the ammonia absorption refrigeration system 12 can be utilized as a cooling medium in heat exchangers used in the propylene refrigerant system to condense the propylene gases.

The following Table indicates the specific pressures, temperatures, and flow rates for the various process streams and the operating conditions for the various equipment utilized in one illustrative example. The information indicated in the Table is to be used in an ethylene production process wherein 110,000 lbs/hr of ethylene are produced and wherein a total amount of 615,500 lbs/hr. of ammonia is circulated to process uses from the ammonia generation tower overhead line 140.

| Apparatus Parts | | Operating Condition and Flow Characteristics | | | | |
|---|---|---|---|---|---|---|
| | | Cracked Gas Process Stream | | | | |
| | | Flow Rate | Temperature ° F. | | Pressure p.s.i.a. | |
| Compressors | Horsepower-BHA | lb/hr | in | out | in | out |
| 64 (1st Stage) | 7650 | 14,890 | 82 | 186 | 19.2 | 47.6 |
| 64 (2nd Stage) | 7520 | 14,090 | 82 | 191 | 42.6 | 105.8 |
| 64 (3rd Stage) | 7740 | 14,640 | 82 | 194 | 100.7 | 249.9 |
| 64 (4th Stage) | 8240 | 15,820 | 82 | 201 | 217.1 | 538.6 |

| Propane-propylene fractionation column 104 | Temperatures 95 to 78° F. | Pressure 170 p.s.i.a. |
|---|---|---|

| | Heat Duty | Ammonia Refrigerant | | | | | Overhead Vapors | | | | |
|---|---|---|---|---|---|---|---|---|---|---|---|
| | | Flow rate | Temperature, ° F. | | Pressure p.s.i.a. | | Flow rate | Temperature ° F. | | Pressure p.s.i.a. | |
| Condensers | MM BTUhr | lb/hr | in | out | in | out | lb/hr | in | out | in | out |
| 110 | 121.3 | 254,380 | 70 | 70 | 130 | 129.5 | 830,840 | 80 | 78 | 174 | 170 |
| 130 | 309. | | | | | | 627,500 | 95 | 95 | 203 | 200 |

| | | |
|---|---|---|
| Generation | Temperatures | Pressure |
| tower 126 | 132 to 95° F. | 205-200 p.s.i.a. |
| Storage | Temperature | Pressure |
| tank 134 | 95° F. | 200 p.s.i.a. |

| Pressure reducing | Ammonia | | | | |
|---|---|---|---|---|---|
| | Flow rate | Temperature ° F. | | Pressure p.s.i.a. | |
| | lb/hr | in | out | in | out |
| valve 142 | 615,500 | 95 | 70 | 200 | 130 |

| | Ammonia Vapors into Absorbers | | | Lean Ammonia Stream into Absorbers | | | |
|---|---|---|---|---|---|---|---|
| Absorbers | Flow rate lb/hr | Temperature ° F. | Pressure p.s.i.a. | Flow rate lb/hr | % ammonia by weight | Temperature ° F. | Pressure p.s.i.a. |
| 148 | 205,170 | 70 | 130 | 4,599,500 | 66 | 104 | 131.5 |
| 150 | 205,170 | 70 | 130 | 4,804,670 | 67 | 101 | 131 |
| 152 | 205,170 | 70 | 130 | 5,009,840 | 68 | 98 | 130.5 |

| | Heat Duty | Rich Ammonia Stream | | | | | Ammonia Refrigerant | | | | | Quench Water | | | | | Steam (low-level waste heat) | | | | | Cooling Water | | | | |
|---|---|---|---|---|---|---|---|---|---|---|---|---|---|---|---|---|---|---|---|---|---|---|---|---|---|---|
| | | flow rate | Temp. ° F. | | pressure p.s.i.a. | | flow rate | Temp. ° F. | | pressure p.s.i.a. | | flow rate | Temp. ° F. | | pressure p.s.i.a. | | flow rate | Temp. ° F. | | pressure p.s.i.a. | | flow rate | Temp. ° F. | | pressure p.s.i.a. | |
| Heat Exchanger | MM BUT/hr | lb/hr | in | out | in | out | lb/hr | in | out | in | out | lb/hr | in | out | in | out | lb/hr | in | out | in | out | lb/hr | in | out | in | out |
| 34 | 153.6 | | 95 | 132 | 207 | 205 | | | | | | | 185 | 156 | 20 | 19 | | | | | | | | | | |
| 42 | 121.2 | | | | | | | | | | | $5.39 \times 10^6$ | 156 | 134 | 19 | 18 | | | | | | | | | | |
| 48 | | | | | | | | | | | | | 134 | 100 | 18 | 17 | | | | | | | | | | |
| 52 | 13.56 | | | | | | | | | | | | | | | | | | | | | | 80 | 120 | | |
| 56 | 15.55 | 32553 | | | | | | 70 | 70 | 130 | 129.5 | | | | | | | | | | | $0.68 \times 10^6$ | 80 | 100 | | |
| 72 (one turbine drives all four stages) | 208.7 | | 95 | 132 | 207 | 205 | | | | | | | | | | | | 160 | 160 | 4.7 | 4.5 | | | | | |

-continued

| Apparatus Parts | | | | Operating Condition and Flow Characteristics | | | | | | |
|---|---|---|---|---|---|---|---|---|---|---|
| 80 | (1st Stage) | 23.0 | | | | | | $0.58 \times 10^6$ | 80 | 120 |
| 80 | (2nd Stage) | 21.3 | | | | | | $0.53 \times 10^6$ | 80 | 120 |
| 80 | (3rd Stage) | 23.6 | | | | | | $0.59 \times 10^6$ | 80 | 120 |
| 80 | (4th Stage) | 32.8 | | | | | | $0.82 \times 10^6$ | 80 | 120 |
| 84 | (1st Stage) | 5.0 | 10,467 | 70 | 70 | 130 | 129.5 | | | |
| 84 | (2nd Stage) | 4.2 | 8,792 | 70 | 70 | 130 | 129.5 | | | |
| 84 | (3rd Stage) | 3.3 | 6.908 | 70 | 70 | 130 | 129.5 | | | |

While the foregoing preferred embodiment has been described with respect to an ammonia evaporation pressure of 130 p.s.i.a. which corresponds to a temperature of about 70° F. as the ammonia refrigerant is passed through the various process heat exchangers, ammonia refrigerant at lower temperature levels may also be obtained without departing from the process scheme described in the foregoing. Hence, without departing from the process scheme of the invention, the ammonia refrigerant in line 140 may be flashed through valve 142 to a pressure as low as about 100 p.s.i.a. which will result in a refrigeration temperature of about 55° F. as the ammonia is passed to the various heat exchanger uses associated with line 144.

When the ammonia refrigeration at a temperature level of about 55° F. is so obtained by the process of the invention, the ammonia refrigerant to condenser 110 through line 112 would therefore also be available at a temperature of 55° F. Thus, with ammonia refrigerant available at a level of 55° F. to condenser 110, propane-propylene fractionation column 104 can be operated at a pressure as low as about 140 p.s.i.a. At 140 p.s.i.a. the propylene rich overhead from fractionation column 104 will be at a temperature of about 63° F. as it is passed through line 108 to condenser 110. Operation of propane-propylene fractionation column 104 at lowered pressures is desirable since propylene and propane are more easily separated as the fractionation pressure is lowered. Thus, the lower pressure operation of fractionation column 104 permitted by use of ammonia refrigerant at temperatures between 55° to 70° F. as contemplated by the process of this invention results in an easier separation between propylene and propane and thus fewer fractionation trays are required in column 104.

Additionally, it should be understood that with ammonia refrigerant levels lower than 70° F., for example between 55° F. and 70° F. the cracked gas streams passing through heat exchangers 56 and the first, second and third compressor stage heat exchangers 84 can be cooled to temperatures lower than 80° to 85° F. Specifically, when the ammonia refrigerant level is 55° F. the cracked gas passing through heat exchangers 56 and 84 can be readily cooled to approximately 65° F. The lower cracked gas temperatures at the inlet to the compressor stages 64 (stages one through four) results in reduced horsepower requirements at each stage of compression.

Although the embodiment described herein is in terms of a single generation tower and absorbers in series it should be understood that several generation tower in parallel each heated by a separate source, as well as several additional absorbers in parallel, may be employed.

While we have fully described an embodiment of the foregoing invention, it is to be understood that this description is offered by way of illustration only. The range of adaptability of the process presented herein is contemplated to include many variations and adaptions of the subject matter within the scope of olefin production, and it is to be understood that this invention is to be limited only by the scope of the appended claims.

We claim:

1. In a process for thermally cracking hydrocarbons to produce olefins said process having a cracking zone, a rapid cooling zone, a primary fractionation and cooling zone, a compression zone and a purification zone wherein waste heat is released and cooling of system streams is effected, the improvement comprising the steps of:

heating a rich ammonia stream from an ammonia absorption refrigeration system with waste heat released from quench water in said primary fractionation and cooling zone and with low-level waste heat released from steam emanating from steam turbines in said compression zone, to generate an ammonia refrigerant in said ammonia absorption refrigeration system; and cooling said system streams in said olefin production process with ammonia refrigerant generated in said ammonia absorption refrigeration system.

2. The process of claim 1 wherein said waste heat released from said quench water is heat released from quench water exiting a direct contact cooler in said primary fractionation and cooling zone.

3. The process in claim 1 wherein said system streams are cooled by said ammonia refrigerant prior to introducing said system streams into compressors utilized to compress said system streams.

4. The process in claim 1 wherein cooling is conducted on overhead vapors exiting a propane-propylene fractionation column.

5. In a process for the production of ethylene by cracking a hydrocarbon to produce a process stream of cracked gases, introducing said process stream of cracked gases into a rapid cooling zone to cool said gases, passing said cooled process stream of cracked gases into a primary fractionation and cooling zone to further cool said gases and remove heavy hydrocarbons, passing said process stream of cracked gases into a compression zone and, thereafter, directing said process stream of compressed cracked gases through a purification zone wherein overhead vapors are generated and ethylene is recovered from said process stream of cracked gases, the improvement which utilizes low-level waste heat released in said primary fractionation and cooling zone and said compression zone to generate an ammonia refrigerant for cooling said process stream of cracked gases in said compression zone and said overhead vapors in said purification zone comprising:

(i) heating a rich ammonia stream with low-level waste heat released from quench water in said primary fractionation and cooling zone and with low-level waste heat released from steam emanating from steam turbines in said compression zone;

(ii) separating the heated rich ammonia stream into substantially pure ammonia vapor and a lean ammonia stream;

(iii) condensing said substantially pure ammonia vapor to ammonia liquid;

(iv) passing said ammonia liquid through pressure reducing means to produce said ammonia refrigerant;

(v) cooling said process stream of cracked gases in said compression zone and said overhead vapors in said purification zone with said ammonia refrigerant;

(vi) thereafter, combining said ammonia refrigerant with said lean ammonia stream to form a rich ammonia stream; and (vii) directing said rich ammonia stream back to step (i).

6. The process of claim 5 wherein said rich ammonia stream is heated in step (i) with low-level waste heat released in said purification zone.

7. The process of claim 6 wherein the source of said low-level waste heat in said purification zone is a propylene refrigerant system.

8. The process of claim 5 wherein said rich ammonia stream is heated in step (i) to a temperature of about 130° to 200° F.

9. The process of claim 5 wherein said ammonia refrigerant is produced in step (iv) at a temperature of about 55° to 70° F.

10. The process of claim 9 wherein said ammonia refrigerant produced in step (iv) is used as a cooling medium in said propylene refrigerant system.

11. A process according to claim 5 wherein in step (i) the temperature of said rich ammonia stream entering said primary fractionation and cooling zone and said compression zone is about 95° F.

12. A process according to claim 5 wherein said ammonia liquid in step (iv) enters said pressure reducing means at a pressure of about 200 p.s.i.a and leaves said pressure reducing means at a pressure of about 100 to 130 p.s.i.a.

13. A process according to claim 5 wherein in step (v) said ammonia refrigerant cools said process stream of cracked gases in said compression zone to a temperature of about 65° to 85° F.

14. A process according to claim 5 wherein in step (v) said ammonia refrigerant cools said overhead vapors in said purification zone to a temperature of about 63° to 85° F.

15. A process according to claim 5 wherein in step (vi) the concentration of said rich ammonia stream is about 70% by weight ammonia.

16. A process according to claim 5 wherein said primary fractionation and cooling zone includes a direct contact cooler and wherein said rich ammonia stream is heated in step (i) with quench water from said direct contact cooler.

17. A process according to claim 16 wherein said purification zone includes a propane-propylene fractionation column and wherein reboiler heat is supplied for said propane-propylene fractionation column by said quench water from said direct contact cooler.

18. A process according to claim 5 wherein said steam from said steam turbines is at a pressure of about 5 p.s.i.a.

* * * * *